Nov. 27, 1962  M. A. LEAVITT ET AL  3,066,185
POWER-WRITING TELESCRIBER

Filed Nov. 21, 1960  5 Sheets-Sheet 1

INVENTORS.
MINARD A. LEAVITT
JOSEPH L. DAUTREMONT, JR.
BY
Christie, Parker & Hale
ATTORNEYS.

Nov. 27, 1962

M. A. LEAVITT ET AL 3,066,185

POWER-WRITING TELESCRIBER

Filed Nov. 21, 1960

INVENTORS.
MINARD A. LEAVITT
JOSEPH L. DAUTREMONT, JR.
BY
Christie, Parker & Hale
ATTORNEYS.

INVENTORS.
MINARD A. LEAVITT
JOSEPH L. DAUTREMONT, JR.
BY
Christie, Parker & Hale
ATTORNEYS.

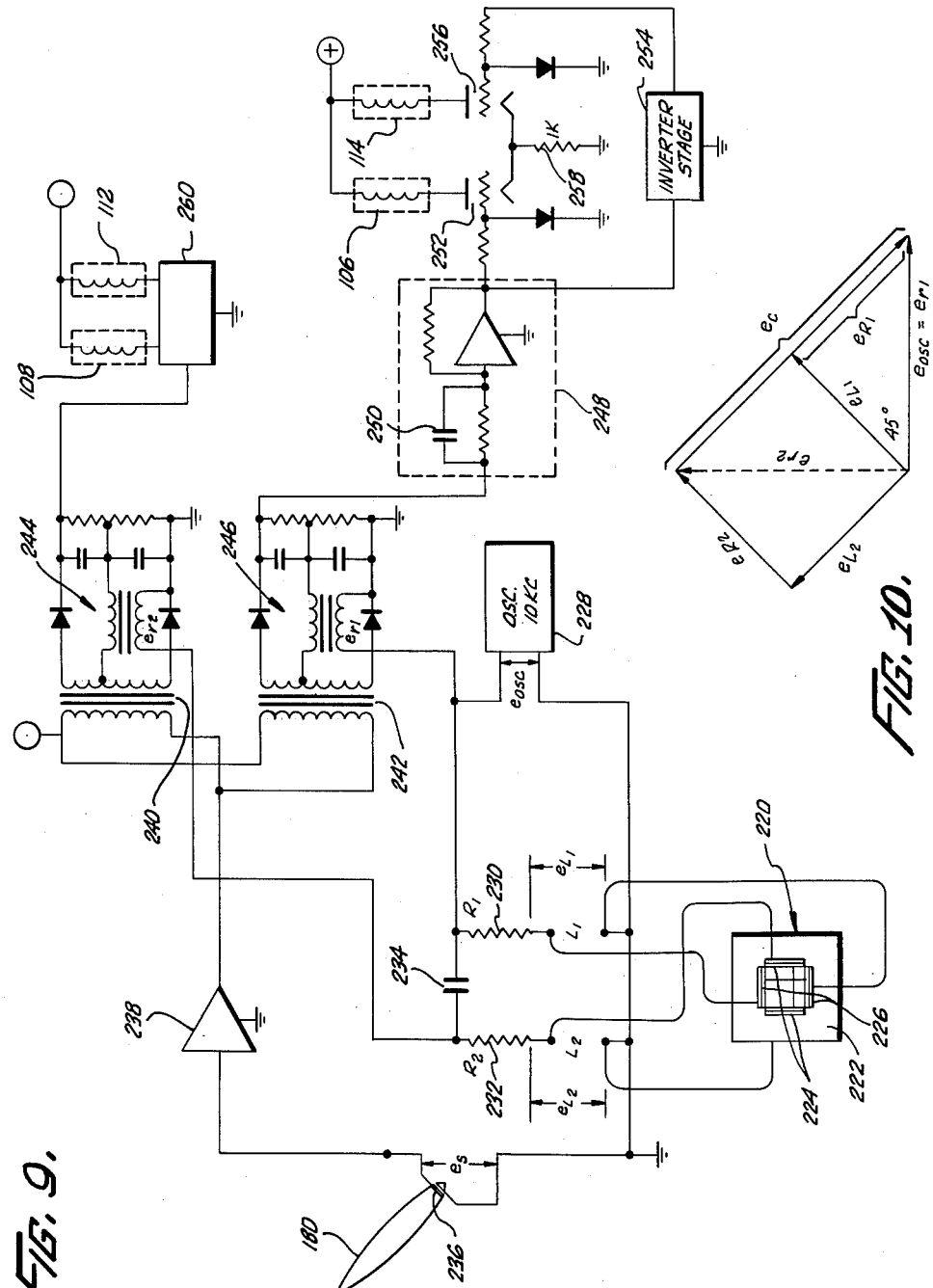

United States Patent Office 3,066,185
Patented Nov. 27, 1962

3,066,185
POWER-WRITING TELESCRIBER
Minard A. Leavitt, Playa Del Rey, and Joseph L. Dautremont, Jr., Los Angeles, Calif., assignors to Telautograph Corporation, Los Angeles, Calif., a corporation of Virginia
Filed Nov. 21, 1960, Ser. No. 70,489
12 Claims. (Cl. 178—19)

This invention relates to telescribing equipment, and more particularly, is concerned with improved apparatus for translating handwritten messages into electrical signals for transmission to a remote point.

Telescribing equipment for translating handwritten messages electrically over transmission wires is well known. Such equipment involves, at a transmitting station, a stylus manipulated by an operator as he would a writing instrument such as a pen. Through mechanical linkage tied to the stylus, the motions are resolved in the two components for controlling a pair of transducers. The position of the stylus is translated by the transducers to corresponding electrical signals. At the receiver end, these electrical signals are used to control a pen device to reproduce the movement of the stylus.

It is desirable, from the standpoint of the operator, that the telescribing equipment not interfere with the natural writing habits of the individual operator. At the same time, the telescribing equipment must be capable of reproducing accurately the writing movements so as to reproduce faithfully the handwritten message at the receiving end. Where mechanical linkages are connected to the writing implement, these linkages must be extremely light and reflect a minimum load on the movement of the writing implement so as not to interfere with the normal writing process. For this reason, telescribing equipment using mechanical linkages has heretofore employed a very limited writing area, since writing over a large area necessitates more rugged and heavy linkage means. While all-electronic machines have been proposed which eliminate any linkage between the stylus held in the operator's hand and the position sensing means, such electronic arrangements have not proved commercially practical because of high cost, poor reliability and limited system flexibility.

In the use of telescribing equipment, the operator wants assurance that a legible message is being transmitted. It has been the practice to provide a local receiver for reproducing the message at the transmitting station from the position component signals. A slave receiver is therefore made part of the transmitter, which can also be used as the receiver for reproducing messages from other stations. The operator, unless the transmitter provides direct writing by the operator on paper, watches the movement of the receiver pen to check continuously the transmitted form of the message with his intended writing form. It is desirable, from the standpoint of the untrained operator, that the pen forming the message be as close to the writing stylus as possible.

The present invention provides an improved telescriber system in which the region of movement of the stylus is directly over the region of movement of the writing pen. Thus, the stylus manipulated by the operator and the driven receiver pen move over the same writing area. This is accomplished by a sensor movable with the pen element that senses movement of the stylus used by the operator. As the stylus is moved over the writing area, the sensor provides a signal for moving the pen. A drive arrangement is provided by which the pen element and sensor are caused to move with changes in position of the stylus as detected by the sensor, whereby the pen is made to reproduce the exact movement of the stylus.

This is accomplished in brief by an arrangement comprising a main frame including a pair of spaced guide members on which a bridge member is movably supported. A carriage member is in turn movably supported on the bridge member. A pen secured to the carriage member is thus movable over a predetermined area defining a writing surface by imparting movement to the bridge and carriage members.

The carriage is movable in two mutually perpendicular axes in the plane of the writing surface by a novel cable arrangement which drives the bridge member and carriage member from a common drive mechanism including four clutches mounted on a common drive shaft. The cables are driven through selective control of the several clutches to move the pen over the writing surface.

A sensor element mounted on the carriage element is arranged to sense the direction of movement of a stylus held in the hand of the operator. Any movement of the stylus above the writing area causes the sensor element to generate an error signal for controlling the clutches. The clutches are operated to reduce any displacement error between the stylus and the sensor to zero. Thus, the carriage with the attached pen and sensor element are caused to follow the movements of the stylus. Potentiometers are driven by the cable system for generating position information signals for controlling a remote telescriber unit.

For a more complete understanding of the invention, reference should be made to the accompanying drawings wherein:

FIG. 9 is an alternative control circuit using an inductive sensor device; and

FIG. 10 is a vector diagram of voltages in the sensor device.

Figure 1:
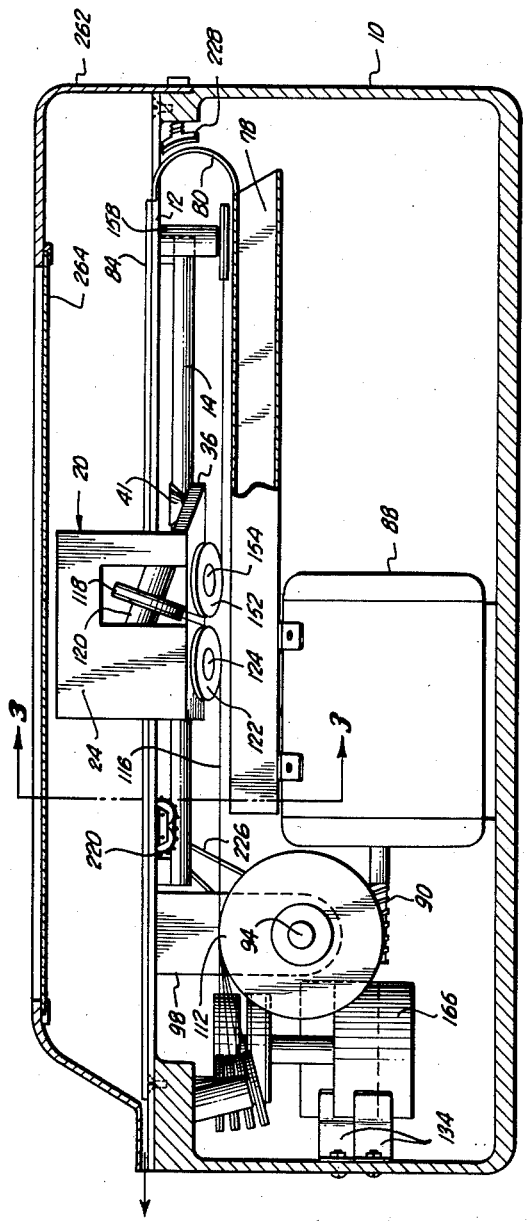
FIG. 1 is a side elevational view with the cover and outer box frame cut away.
Figure 3:
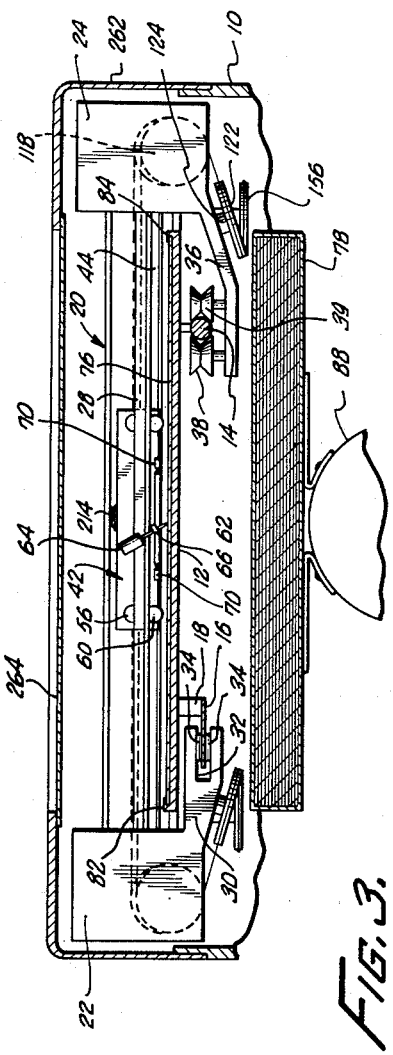
FIG. 3 is a fragmentary sectional view taken on the line 3—3 of FIG. 1.

Referring to FIGS. 1–5 of the drawings in detail, the numeral 10 indicates generally the outer frame of the machine, which preferably is in the form of a single cast box structure open at the top. Mounted on the outer frame 10 is a chassis support plate 12. This plate, over a substantial portion of its length, is narrower than the box frame 10, leaving elongated open regions on either side of the plate 12. Secured underneath and extending parallel to one edge of the plate 12 is a guide rod 14 of circular cross section. A flat guide plate 16 extends parallel with the opposite edge of the plate 12 and is supported in parallel relationship thereto by lugs such as indicated at 18 in FIG. 3.

A bridge assembly, indicated generally at 20, includes a pair of end members 22 and 24 joined above the surface of the plate 12 by a pair of guide members 26 and 28. The end member 22 includes a bracket portion 30 which extends below the bottom surface of the plate 12 and is slotted as indicated at 32, the slot receiving the flat guide plate 16. Suitable flat bushings 34 engage the surfaces of the flat guide plate 16 to give sliding vertical support to the end member 22.

The end member 24 is similarly provided with a bracket portion 36 from which are rotatably supported two sets of opposed grooved guide wheels 38, 39 and 40, 41. The grooved guide wheels engage the guide rod 14 at spaced points, providing both lateral and vertical guidance and support to the end member 24.

Movably supported on the guide members 26 and 28 of the bridge assembly 20 is a carriage assembly indicated generally at 42. As thus shown in FIG. 5, the bridge spanning guide member 26 is channel shaped, providing a lower flange 44 and an upper flange 46. Carriage assembly 42 includes a pair of spaced guide rollers 48 and 50 which ride on the inside of the lower flanged portion 44. A coil spring 51 carried in a hole in the carriage assembly 42 presses against the upper flange 46.

The guide member 28 is provided with an upper groove 52 and a lower groove 54. The upper groove 52 is engaged by a pair of rollers 56 and 58 which are rotatably supported by the carriage assembly 42. A similar pair of rollers, one of which is indicated at 60, engage the groove 54 and are rotatably supported from the carriage assembly 42. In this way the carriage assembly 42 is guided for lateral movement along the guide members of the bridge assembly 20. Thus it will be seen that the combination of the bridge and carriage permits movement of the carriage assembly 42 in two dimensions over a predetermined area.

Supported from the carriage assembly 42 is a pen 62 having an ink reservoir 64. The pen and ink reservoir are supported on the end of an arm 66 which is supported by pivots 68 from a pair of lugs 70 projecting from the carriage assembly 42. An armature plate 67 which is integral with the arm 66 extends below the carriage assembly 42. A pair of solenoids 72 and 74 mounted in the carriage assembly 42 have their pole faces positioned above the armature plate 67. In this manner, when the solenoids are energized, the armature plate 67 is drawn towards the solenoids and the pen 62 is pressed downwardly towards the plate 12. When the solenoids are not energized, the armature plate 67 is sufficiently heavy to lift the pen 62 away from the plate 12 about the pivot 68.

The pen 62 thus may be made to engage a writing surface such as provided by a strip of paper 76 which passes over the top surface of the plate 12. The paper strip 76, which may be folded and stored as a pack beneath the plate 12 in a hollow paper receptacle 78, passes around a semi-circular guide 80 and along grooves provided by guide strips 82 and 84 positioned along the edges of the upper surface of the plate 12.

To produce a visual trace on the paper by remote control, movement is imparted to the carriage assembly 42 and the bridge 20 from an electric motor 88 through a special clutch arrangement and cable connection. The drive motor 88 is mounted on the bottom of the main frame box 10. A worm gear 90 driven by the motor 88 engages a worm wheel 92 mounted on a horizontal shaft 94. Shaft 94 is journalled in bearings carried in bearing support brackets 96 and 98 projecting downwardly from the plate 12.

Mounted at either end of the shaft 94 are two pairs of magnetic clutches indicated generally at 100 and 102. The pair of clutches 100 include a common drive member 104 which is continuously rotated by the shaft 94, and a pair of driven members 106 and 108. The pair of clutches 102 similarly include a common drive member 110 and a pair of driven members 112 and 114. Driven members 106, 108, 112 and 114 each comprise an outer cylindrical drum surface. Electromagnetic means, not shown, is located within the region defined by the outer drum surface of each of the driven members and arranged such that electrically energizing any one of four electromagnets respectively couples the driven members 106, 108, 112 and 114 to the drive shaft 94 through the drive members 104 and 110 respectively. Electromagnetic clutches of the general type used in this present invention are well known in the art and, therefore, it is not believed necessary to describe such clutches in more detail. See, for example, the clutch described in Patent No. 2,706,544. The clutches have frictional surfaces which are pressed together by electromagnets, the pressure being controlled by the amount of current passed through the electromagnets.

By means of a special cable arrangement, the four electromagnetic clutches can be used to control movement of the carriage from the driven motor 88. The cable arrangement includes two lengths of cable, both lengths being anchored at the two ends thereof to the carriage assembly 42. The first length of cable, indicated at 116, extends from the end anchored to the lefthand side of the carriage assembly 42 as viewed in FIG. 4 over a pulley 118 carried by a shaft 120 in the end member 24 of the bridge assembly 20. After passing down around the pulley 118, the first cable section 116 passes around a pulley 122 journalled on a stud shaft 124 supported by and projecting down from the bracket portion 36 of the bridge assembly. The first cable section 116 then makes several turns around the drum surface of the driven member 114. The cable may be positively secured to the driven member 114 at one point since a portion of the cable never leaves the drum surface through the maximum extent of movement.

The cable 116 then makes a quarter turn around a guide pulley 126 which is rotatably supported from the main outer frame 10 by stud shaft 128. The cable section 116 after making a quarter turn around the pulley 126 makes several turns around a drum 130 which is secured to the shaft of a potentiometer 132. Potentiometer 132 is supported from the plate 12 by a suitable bracket 134.

After passing around the drum 130, the cable section 116 takes a quarter turn around a guide pulley 136 rotatably supported by a stud shaft 138 from the outer frame 10, and then passes in several turns around the drum surface of the driven member 106. Coming off the driven member 106, the cable section 116 extends the full length of the plate 12 to a pulley 140 rotatably supported on the end of a stud shaft 142 extending down from the plate 12. After making a half turn around the pulley 140, the first cable section 116 makes a quarter turn around a pulley 144 rotatably supported on a stud shaft 146 which is secured to the underside of the portion 30 of the carriage end frame member 22.

After making a quarter turn around the pulley 144, the cable 116 passes around a pulley 148 journalled on a shaft 150 in the end member 22 and thence passes parallel to the guide member 26 back to the carriage assembly 42 where it is anchored.

Figure 2:
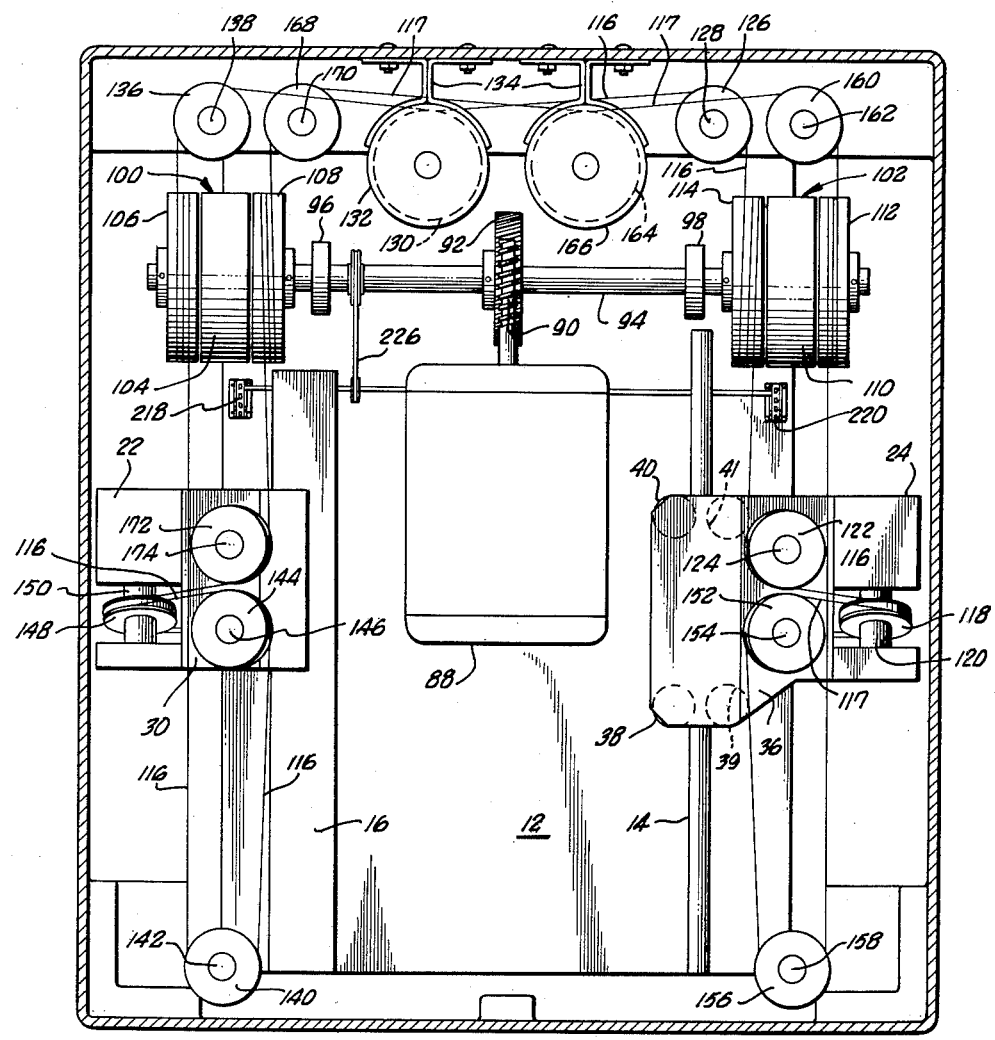
FIG. 2 is a bottom view with the outer box frame cut away.
Figure 4:
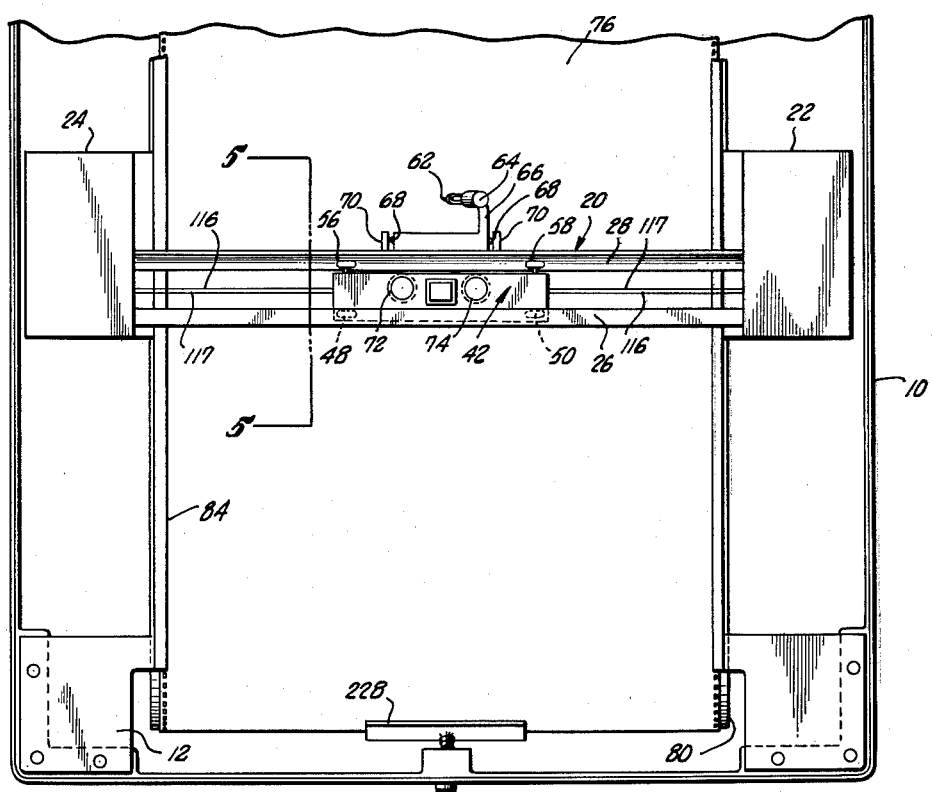
FIG. 4 is a partial top view.
Figure 5:
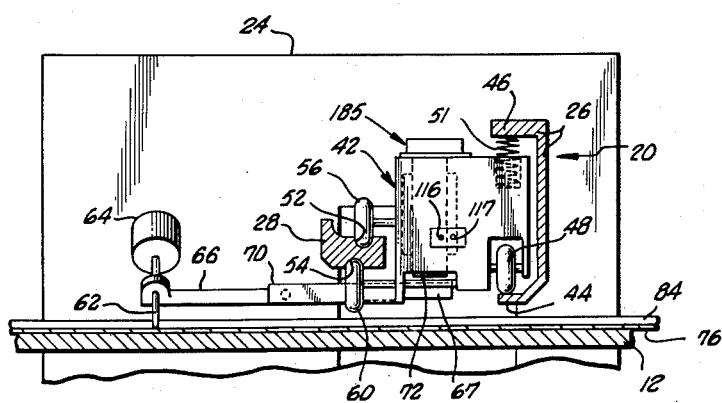
FIG. 5 is a fragmentary sectional view taken on the line 5—5 of FIG. 4.

In a similar fashion a second cable section 117 extends from one end anchored to the carriage assembly 42 around the pulley 118 and makes a quarter turn around a pulley 152 rotatably supported by stud shaft 154 secured to the lower surface of the portion 36 of the bridge and frame member 24, as best seen in FIG. 2. After making a half turn around a pulley 156 rotatably supported on a stud shaft 158 extending from the bottom of plate 12, the cable 117 takes several turns around the drum surface of the driven member 112. After leaving the drum surface of the driven member 112, the cable 117 makes a quarter turn around a pulley 160 rotatably supported on a stud shaft 162. The cable 117 then makes one or more turns around the drum 164 secured to the shaft of a potentiometer 166 supported by the bracket 134 in the same manner as the potentiometer 132.

After making a quarter turn around a pulley 168 rotatably supported on a stud shaft 170 from the frame 10, the cable 117 makes several turns around the drum surface of the driven member 108 and then makes a quarter turn around a pulley 172 rotatably supported on a stud shaft 174 secured to the under surface of the portion 30 of the bridge end member 22. After making a quarter turn around the pulley 172, the cable 117 passes around the pulley 148 and thence back to the carriage assembly 42 to which it is anchored.

With this cable arrangement, energizing of any one of the four clutches produces equal movement of the bridge and carriage. The result is movement of the pen along one or the other of the two mutually perpendicular 45° diagonal axes. The direction of movement along either of these axes is determined by which of the two clutches associated with a particular one of the two cable sections is energized.

If two clutches are simultaneously fully energized, the two clutches being associated respectively with each of the two cable sections 116 and 117, movement of the pen along a zero or X axis or along a 90° or Y axis is produced. Again the direction of movement is determined by the combination of two clutches selectively energized. By varying the relative speed at which the two cables are driven (by varying the clutch energizing currents), movement in any direction over the writing surface can be obtained. Control of the four clutches to obtain the desired speed and direction of drive of the two cable sections 116 and 117 in response to control signals is provided by the control circuit shown schematically in FIG. 6.

The apparatus as thus far described can be employed as either the transmitter or receiver of a telescribing system. Movement of the carriage element 42 of the transmitting unit is sensed by the potentiometers 132 and 166 and translated into signals which are sent to a receiver unit. At the receiver unit, the received signals are compared with the signals derived from the potentiometers and the respective electromagnetic clutches controlled to move the carriage element at the receiver station in a manner to maintain the difference between the received signal and the signal across the potentiometers at a substantially zero difference. The control circuitry associated with the telescribing unit is shown schematically in FIG. 6 and is hereinafter described in detail.

One of the important features of the present invention is that the cable drive through the electromagnetic clutches in the transmitter unit are utilized to provide power assisted writing. When operating the unit described above as a transmitter, the operator uses a writing stylus 180 which may, for example, be arranged with a ball tip that can be inserted in a socket mounted on the top of the carriage assembly 42. Without the power assisted feature, the entire load imposed on the stylus in moving the carriage assembly 42, the bridge assembly 20, and the associated cable system, potentiometers and clutch driven members is imposed on the operator in moving the writing stylus. This load interferes with normal handwriting movements. However, this load is eliminated by the power assist feature of the present invention.

Figure 6:
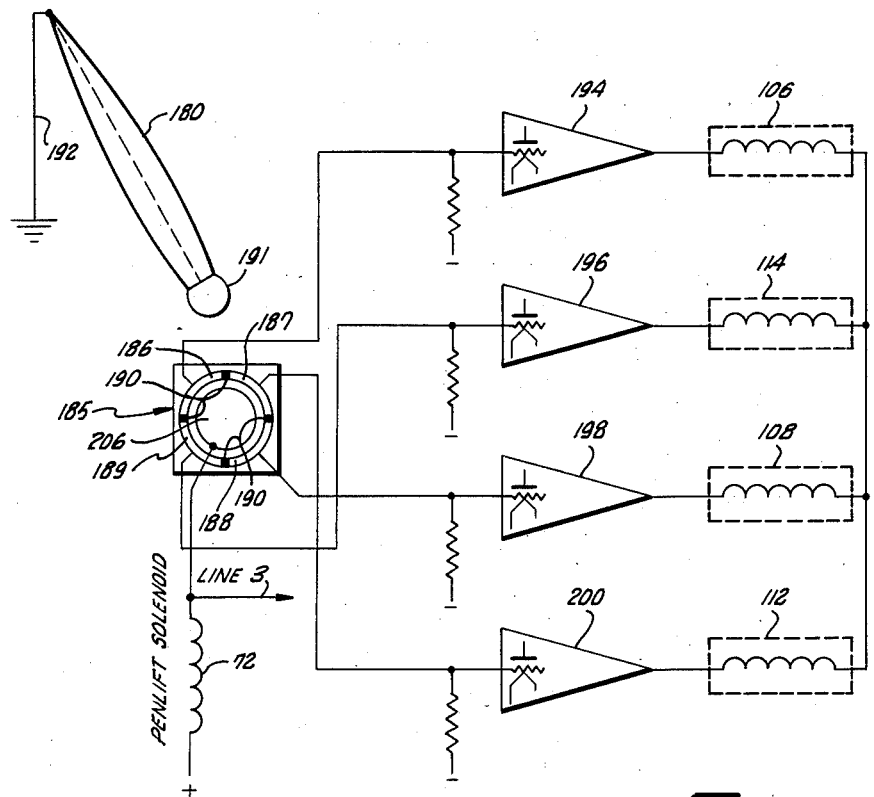
FIG. 6 is a schematic diagram of the electrical circuit for controlling the telescriber system.

This feature is accomplished, in the embodiment of FIG. 6, by arranging the socket as a sensor device for generating signals indicative of the direction of movement of the stylus by the operator relative to the position of the carriage assembly 42. The sensor element may take a variety of forms for indicating the direction of the instantaneous displacement of the stylus relative to the carriage assembly 42. For example, the sensor element may be arranged to provide an indication proportional to the amount of displacement of the stylus in addition to an indication of the direction of displacement. On the other hand, the sensor element may only indicate direction.

In one of its simplest forms, the socket forms a sensor element 185, as shown in FIG. 6, comprising four electrical contacts arranged in the form of four cylindrical segments 186, 187, 188 and 189 separated by thin insulator strips 190. The insulators are located along axes parallel to the direction of movement of the bridge member and the carriage member. The stylus 180 is provided with a spherical tip 191 which is electrically grounded through a wire 192 extending from the stylus to the frame of the instrument. The spherical tip 191 is of slightly smaller diameter than the internal diameter of the four cylindrical contacts and so may be inserted in the cylindrical space provided by the contacts 186–189. Lateral displacement of the stylus along any of the diagonals from a center position brings the stylus tip 191 into contact with one of the contacts thereby grounding that contact.

Each of the cylindrical contacts 186–189 is connected to a respective one of four amplifiers 194, 196, 198 and 200. The input stages of the respective amplifiers are normally biased to cut off, but, when grounded by the action of the stylus 180, provide a power output signal for actuating one of the four electromagnetic clutch coils associated with the driven members 106, 108, 110 and 114. In this manner, whenever the stylus 180 is moved, the tip 191 grounds one of the contacts 186–189, energizing the associated clutch. This results in movement of the bridge assembly 20 and carriage assembly 42 in directions to move the particular contact away from the stylus tip 191.

While the sensor element 185 and associated control circuitry provide substantially an on-off control of the several clutches, providing an unstable servo system, the hunting frequency of the system can be made relatively high. As a result, a high frequency low amplitude vibration of the pen 62 is produced which has negligible effect on the quality of the trace formed on the paper. By making the stylus 180 of highly damped elastic material, such as a yieldable plastic or soft rubber, much of the vibration otherwise transmitted to the stylus can be absorbed in the stylus rather than being transmitted to the hand of the operator.

Thus it will be seen that a power assist feature is provided since most of the energy required to move the carriage assembly 42 over the surface of the paper is derived from the motor 88 through the clutches. Very little effort is required on the part of the operator to move the stylus. In fact, the operator can move the stylus with even less effort than in executing handwriting with a pen or pencil, and the carriage assembly 42 follows every movement of the stylus.

Control of the pen-life solenoid 72 may be provided by a contact 206 at the bottom of the sensor element socket formed by the cylindrical contacts 186–189. When the stylus is pressed down in the sensor element, the contact 206 is grounded through the stylus. The solenoid 72 is connected at one end to a grounded D.C. potential source. When the stylus grounds the contact 206, the solenoid 72 is energized. With the solenoid 72 energized, the pen 62 engages the writing surface, but when the stylus is lifted off the contact 206, the pen lifts off the writing surface.

Figure 7:
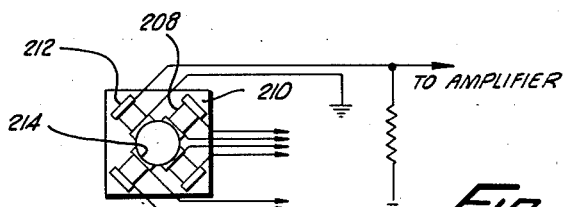
FIGS. 7 and 8 show modified sensor devices which may be used in conjunction with the control circuit of FIG. 6.

Alternative sensor elements which provide a proportional type control may be employed in place of the on-off type of sensor element 185 described in connection with FIG. 6. For example, the four contacts can be replaced by pressure-sensitive means such as granulated carbon buttons or carbon piles. Such an alternative is shown in FIG. 7. The four carbon buttons 208 are arranged along the diagonals of a sensor base plate 210. The carbon buttons are supported at one end from the base plate 210 by means of suitable bracket supports 212. The other end of each of the carbon buttons is provided with a pressure contact 214. These contacts are arranged to form a socket into which the spherical end 191 of the stylus 180 is inserted. Pressing of the stylus against any one of the pressure contacts compresses the carbon granules in the associated button, reducing the resistance of the carbon button. One end of each carbon button is connected to ground, and the other end is connected to the input of an associated clutch driving amplifier, such as the amplifiers of the circuit shown in FIG. 6. Thus, as the pressure on the carbon button is increased, reducing its resistance, the amplifier input goes more positive and the energization of the associated clutch is thereby increased. Thus, by substituting the sensor element of FIG. 7 in the circuit of FIG. 6 in the manner described, appropriate control of the clutches is effected by pressure of the stylus against the pressure contacts 214.

Figure 8:
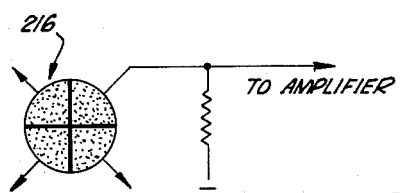

Proportional control can also be achieved by a displacement sensor element such as shown in FIG. 8. In this arrangement, a circular disc 216 having a coating of resistive material, such as used in making the resistive strips of standard potentiometers and the like, is employed. The circular disc is divided into four quadrants which are electrically insulated from each other. Electrical connection is made to each of the four quadrants of the disc along the diagonals at the outer periphery of the disc. Where the sensor element of FIG. 8 is employed in the drive circuitry shown in FIG. 6, the respective quadrants of the resistive disc are directly connected to the four drive amplifiers.

With such an arrangement as shown in FIG. 8, displacement of the stylus along the diagonals from a center position decreases the resistance of the current path from ground to the negative potential applied to the bias resistor on the input of the associated amplifier. Thus, displacement of the stylus from the center position along one of the diagonals drives the input of the associated amplifier more positive, resulting in the corresponding clutch becoming more strongly energized. As in the operation of the sensor of FIG. 7, a proportional control is achieved rather than an on-off control as in the sensor element described in connection with FIG. 6.

The particular sensor element described in FIG. 7 is respresentative of a class of pressure-sensitive sensor elements which may be employed. It would be readily apparent that other equivalent pressure-sensitive transducer elements may be substituted for the carbon buttons, such as piezoelectric crystals and the like. Likewise, the arrangement shown in FIG. 8 is merely representative of a class of sensor elements which produces a control signal in proportion to displacement of the styles.

All of the sensor elements as thus far described require physical contact between the writing stylus and the sensor element as mounted on the carriage assembly 42. An alternative type of sensor element and associated clutch control circuit is shown in FIG. 9. This arrangement depends on an inductive coupling between the sensor element and a coil in the stylus, thus eliminating the need for physical contact between the sensor element and stylus. The sensor element, indicated generally at 220 in FIG. 9, includes a mounting plate 222 which is secured in a horizontal plane on the top of the carriage assembly 42. Mounted on the base plate 222 are two pairs of coils 224 and 226. The two pairs of coils are arranged in quadrature relationship with the pair of coils 224 having a common axis extending parallel to the direction of movement of the carriage assembly 42, and the pair of coils 226 having a common axis extending parallel to the direction of movement of the bridge assembly 20. The two coils in each pair are connected in series with one end of each of the series connected pairs of coils connected to ground. The two pairs of coils are coupled to a 10 kc. oscillator 228, the pair of coils 226 being connected in series with a resistor 230 across the output of the oscillator. The pair of coils 224 are connected in series with a resistor 232 and a capacitor 234 across the output of the oscillator. By making the inductive reactance of the respective pairs of coils equal to the resistance of the series resistors and equal to half of the capacitive reactance of the capacitor 234, the voltages $e_{L1}$ and $e_{L2}$ across the respective pairs of coils 226 and 224 are equal and in phase quadrature with respect to each other and are respectively 45 degrees and 135 degrees out of phase with the voltage $e_{osc}$ across the output of the oscillator 228. This is shown in the vector diagram of FIG. 10.

The stylus 180 is provided with a coil 236 which is wound with its axis along the axis of the stylus. One end of the coil 236 is connected to ground. The other end is connected to the input of an amplifier 238.

When the coil 236 is moved about in relation to the two pairs of sensor coils 224 and 226, a voltage is inductively coupled across the coil 236. When the coil 236 is moved about over the coils 224 and 226, it will pass through a single null point in which there is zero coupling between the coil 236 and both pairs of coils 224 and 226. When the coil 236 is moved in any direction from this point, the amplitude of the induced voltage across the coil 236 increases to some maximum and then begins to decrease as the coil is moved further and further away from the region of the sensor 220. In addition, the phase of the voltage $e_s$ induced across the coil 236 in relation to the voltage $e_{osc}$ at the output of the oscillator 228 varies with the direction in which the stylus is displaced with relation to the null point. Thus the voltage $e_s$ varies in magnitude and phase as a function of the amount and direction of displacement of the stylus 180 with respect to the null position. It will be apparent, therefore, that the voltage $e_s$ across the coil 236 contains all the information necessary to control the positioning of the bridge assembly 20 and carriage assembly 42 always to maintain the sensor element 220 in substantially fixed relation to the stylus 180 as the stylus is moved about.

The signal $e_s$ is amplified by the amplifier 238 and applied to the primary windings of two transformers 240 and 242. The secondary of the transformer 240 provides one input to a conventional balanced phase detector circuit indicated generally at 244. Similarly the secondary of the transformer 242 provides the input to a balanced phase detector 246. The reference voltage $e_{r2}$ for the phase detector 244 is derived from the oscillator 228 through the capacitor 234 and the reference voltage $e_{r1}$ for the phase detector 246 is derived directly from the output of the oscillator 228. Thus two two reference voltages are equal and in phase quadrature as shown by the vector diagram of FIG. 10. The balanced phase detector circuits produce D.C. output signals whose magnitude and plurality are a function of the amount and direction of the displacement of the stylus in relation to the null point. These D.C. signals are used to control the respective clutches to re-establish a null condition in which the voltage across the coil 236 and, therefore, the output voltages of the two phase detector circuits go to zero.

To this end the output of the phase detector 246 is coupled to a D.C. lead amplifier 248. The lead amplifier includes a capacitor 250 which introduces a small lead factor in the servo loop. This is conventional in servo systems for improving sensitivity of the servo loop. The output of the lead amplifier 248 is coupled to the grid of a driver stage 252 to control the current through the clutch coil associated with the driven member 106 connected in the plate circuit. The output of the lead amplifier 248 is also coupled through an inverter stage 254 to the grid of a driver stage 256 which controls the current through the clutch coil associated with the driven member 114 connected in the plate circuit thereof. Driver stages 252 and 256 have a common cathode resistor 258.

In operation, with zero output signal from the phase detector 246, both driver stages 252 and 256 are slightly conductive. As a positive voltage is developed across the output of the phase detector 246, the driver stage 252 becomes more conductive, and the driver stage 256 is biased towards cut off. A negative voltage on the output of the discriminator reverses the situation. Thus one or the other of the clutch coils is energized through a common cathode resistor 258 which provides degenerative feedback when one of the stages is cut off. This gives added stability to the servo drive.

The output of the phase detector 244 similarly controls the other two clutch coils through a similar power amplifier and control circuit 260.

With use of the circuit of FIG. 9 which permits the stylus to be physically separated from the sensor element mounted on the carriage assembly 42, it is desirable to provide a cover 262 having a glass plate 264 overlying the region in which the carriage assembly 42 moves. The glass cover permits the operator to view the movement of the pen 62 across the paper and at the same time provides a convenient writing surface for the stylus 180. The operator can rest his hand on the surface of the glass while writing across the surface of the glass with the tip of the stylus. At the same time he can observe the resulting movement of the pen 62 across the surface of the paper to see that the machine is properly reproducing his handwriting movements.

A pen-lift signal can be provided in the arrangement of FIG. 9 by a suitable switch (not shown) mounted in the stylus 180 which is actuated by the pressure of the stylus tip on the glass surface.

The invention as set forth above provides an extremely sensitive, fast-acting servo system which is capable of reproducing normal handwriting motions. Because of its high sensitivity and accuracy, the apparatus is useful as a plotter as well as a telescriber. The arrangement of cable and clutch drive results in a compact and yet powerful plotter device. For a given paper size, a relatively small machine is achieved.

Because of the power assisted writing feature of the transmitter unit, the writing element may be rugged and be made to exert sufficient pressure to make carbon copies. Furthermore, the transmitter unit and receiver unit can be made identical with simple switching supplying the only modification required to interchange the function of a transmitter and a receiver.

What is claimed is:

1. A telescriber unit comprising a main frame, a bridge member movably supported by said main frame, a writing surface bridged by the bridge member, a writing member movable along the bridge member in a direction perpendicular to the direction of movement of the bridge member including a writing element for producing a visual trace on the writing surface, a stylus movable by an operator, an error sensor mounted on the writing member and movable therewith for producing displacement indicative signals indicative of the direction of displacement between the stylus and the sensor along two orthogonal axes, means for driving the bridge member and the writing member along their respective paths of movement, and means coupled to the error sensor for actuating the drive means to reposition the error sensor and associated writing member relative to the stylus in response to said displacement indicative signals.

2. Apparatus as defined in claim 1 further including means for starting and stopping the writing action of the writing element, and means coupled between the error sensor and the means for starting and stopping the writing action for controlling said starting and stopping means to interrupt the visual trace when the stylus is lifted up by the operator.

3. Apparatus as defined in claim 1 further including first means coupled to the writing element for generating a signal indicative of the instantaneous position of the writing element along said one of the orthogonal axes in response to movement of the error sensor and writing element along the one of the axes, and second means coupled to the writing element for generating a signal indicative of the instantaneous position of the writing element along the other of the orthogonal axes in response to movement of the error sensor and writing element along the other of the orthogonal axes.

4. A power writing device comprising a writing member, means supporting the writing member for movement over a writing surface, first drive means for moving said writing member in either direction parallel to a first coordinate of position, second drive means for moving said writing member in either direction parallel to a second coordinate of position, a stylus movable with respect to the writing member, a sensor element associated with the writing member and movable therewith, the sensor element including means for generating a first error signal indicative of the displacement of the stylus with respect to the sensor element in a direction parallel to the first coordinate of position and generating a second error signal indicative of the displacement of the stylus with respect to the sensor element in a direction parallel to the second coordinate of position, means coupled to the sensor element for actuating said first drive means for moving the writing member in a direction parallel to the first coordinate of position in response to said first error signal, and means coupled to the sensor element for actuating said second drive means for moving the writing member in a direction parallel to the second coordinate of position in response to said second error signal.

5. A telescriber transmitter comprising a movable member, first and second linkage means for positioning the movable member according to first and second coordinates of position over a predetermined area, first and second drive means coupled respectively to the first and second linkage means for driving the linkage means to position the movable member, a stylus movable over the predetermined area, sensor means associated with the movable member for sensing movement of the stylus relative to the movable member, and servo control means coupled between the first and second drive means and the sensor means for operating the first and second drive means in a direction to maintain the movable means in substantially fixed relationship to the stylus, whereby the movable member automatically follows the movement of the stylus.

6. Apparatus as defined in claim 5 wherein the sensor means includes a plurality of contacts and the stylus is movable into electrical contact with any one of the contacts to actuate a circuit indicative of the direction of any displacement of the stylus relative to the movable member.

7. Apparatus as defined in claim 6 wherein the contacts comprise variable resistance elements that produce a signal that varies with the amount of displacement of the stylus with respect to a particular contact.

8. Apparatus as defined in claim 5 wherein the contacts comprise pressure-sensitive elements which produce a signal that varies with the pressure of contact by the stylus.

9. Apparatus as defined in claim 5 wherein the sensor means includes two solenoid coils having mutually perpendicular axes lying in a plane parallel to the area of movement of the movable member, the stylus includes a solenoid coil inductively coupled to the coils of the sensor means, and the servo control means includes means for energizing the two coils of the sensor means with alternating currents that are in relative phase quadrature, a pair of phase detectors, means for coupling each of the phase detectors to the coil of the stylus and respectively to each of the coils of the sensor means, and means respectively coupling the phase detectors to the first and second drive means for causing the respective phase detectors to actuate the first and second drive means.

10. Apparatus comprising a movable member, a stylus adapted to be freely movable over a predetermined area independent of the movable member, first drive means linked to the movable member for moving the member along a first coordinate of position within said predetermined area, second drive means linked to the movable member for moving the member along a second coordinate of position within said predetermined area, means for actuating the first drive means in a direction to reduce any displacement between the movable member and the stylus along the first coordinate, and means for actuating the second drive means in a direction to reduce any displacement between the movable member and the stylus along the second coordinate, whereby any movement of the stylus over the predetermined area results in a corresponding movement of the movable member.

11. Apparatus as defined in claim 10 further including first transducer means actuated by the first drive means for generating a first signal indicative of the position of the movable member along the first coordinate and second transducer means actuated by the second drive means for generating a second signal indicative of the position of the movable member along the second coordinate, means for transmitting the first and second position signals, and remote receiver means for reproducing the movement of said movable member in response to the first and second position signals.

12. Apparatus as defined in claim 10 further including means defining a writing surface within said predetermined area, trace producing means secured to the movable member for producing a visual trace on the writing surface, and means coupled between the movable member and the first and second drive means for controlling said trace producing means to interrupt the trace in response to movement of the stylus in a direction perpendicular to the predetermined area.

References Cited in the file of this patent

UNITED STATES PATENTS

| | | |
|---|---|---|
| 2,186,252 | Little | Jan. 9, 1940 |
| 2,415,718 | Wilson | Feb. 11, 1947 |
| 2,586,160 | Handel | Feb. 19, 1952 |
| 2,923,770 | Lally | Feb. 2, 1960 |
| 2,965,714 | Adler | Dec. 20, 1960 |